(12) United States Patent
Christie, IV

(10) Patent No.: US 6,445,695 B1
(45) Date of Patent: Sep. 3, 2002

(54) SYSTEM AND METHOD FOR SUPPORTING COMMUNICATIONS SERVICES ON BEHALF OF A COMMUNICATIONS DEVICE WHICH CANNOT PROVIDE THOSE SERVICES ITSELF

(75) Inventor: Samuel H. Christie, IV, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/223,880

(22) Filed: Dec. 31, 1998

(51) Int. Cl.[7] .............................. H04L 12/66; H04J 3/16
(52) U.S. Cl. ...................................... 370/352; 370/466
(58) Field of Search .......................... 370/264, 351–4, 370/389, 395.1, 395.61, 395.5, 419, 463, 465–469, 400–2

(56) References Cited

U.S. PATENT DOCUMENTS

| | | | | |
|---|---|---|---|---|
| 6,031,896 A | * | 2/2000 | Gardell et al. | 370/352 |
| 6,161,008 A | * | 12/2000 | Lee et al. | 370/352 |
| 6,229,804 B1 | * | 5/2001 | Mortsolf et al. | 370/352 |
| 6,259,691 B1 | * | 7/2001 | Naudus | 370/352 |
| 6,275,574 B1 | * | 8/2001 | Oran | 370/352 |
| 2001/0026548 A1 | * | 10/2001 | Strathmeyer et al. | 370/356 |
| 2001/0028649 A1 | * | 10/2001 | Pogossiants et al. | 370/389 |
| 2001/0028654 A1 | * | 10/2001 | Anjum et al. | 370/401 |
| 2002/0018464 A1 | * | 2/2002 | Kikinis | 370/352 |

* cited by examiner

Primary Examiner—David Vincent
(74) Attorney, Agent, or Firm—Withrow & Terranova, P.L.L.C.

(57) ABSTRACT

A system and method for supporting communications services on behalf of a communications device which cannot provide those services itself in a communications network based on functional signaling. A terminal is designed to identify a supporting server/terminal proxy upon initialization. Henceforth, the terminal provides each user input stimulus to the server and responds to stimulus from the server. The server manages the state machine of the terminal, provides supplementary services, and meets protocol requirements for the network interface.

16 Claims, 2 Drawing Sheets

SYSTEM AND METHOD FOR SUPPORTING COMMUNICATIONS SERVICES ON BEHALF OF A COMMUNICATIONS DEVICE WHICH CANNOT PROVIDE THOSE SERVICES ITSELF

TECHNICAL FIELD

The present invention relates to a system and method for supporting communications services on behalf of a communications device which cannot provide those services itself. More specifically, the present invention relates to a system and method for supporting foreign terminals in a communications network.

BACKGROUND AND RELATED ART

In the developing field of IP telephony, there are a multitude of network architecture designs and implementations to consider. The ultimate goal, from a subscriber standpoint, is to provide an IP telephony system that does not require the subscriber to alter the way they perform existing tasks such as placing and receiving calls, and does not affect the set of calling services (caller ID, call forwarding, etc.) that the subscriber may have subscribed to. That is, any new IP telephony system should operate such that subscribers do not have to learn new means for accessing and using services they have always used from their traditional phones should those phones be so called "dumb" terminals.

IP telephony protocols, and there are several under industry-wide consideration, and existing telephony protocols are quite different due to the fact that each handles voice and/or data signals differently. The chief difference is that an IP network partitions a voice and/or data signal into packets and relays the packets over the network from point to point. The packets are then re-arranged at the endpoint for distribution to the consumer in a usable form. Most existing telephony networks are analog in nature meaning signals are not broken into digital packets.

Moreover, IP telephony networks and existing telephony networks must be made compatible with one another in order to allow an IP telephony subscriber to communicate with a non-IP telephony subscriber and vice-versa. This necessitates network interfaces capable of converting between IP standards and protocols and existing standards and protocols.

Existing telephony networks have an advantage over IP telephony networks in that extensive call processing network hardware is already in place. Moreover, calling services have been developed to operate within existing telephone architecture. Thus, it makes sense to develop an IP telephony system that can utilize to the greatest extent possible the existing network architecture. This primarily entails upgrading certain existing hardware with the previously mentioned network interfaces capable of converting between IP standards and protocols and existing standards and protocols. Another option is to create standalone network interface devices that perform protocol conversion. Such devices would then augment existing architecture. It is to be understood that some of the protocol conversion between IP telephony and existing telephony can be achieved via software. That is, a 100% hardware solution is not required.

As mentioned before, an IP telephony subscriber may want to access the same calling services as existing telephony subscribers. There are a multitude of such services that are currently offered by telephony service providers. These services all require some form of call processing logic to achieve their stated goal. Some services require more extensive processing than others and therefore are network based meaning that the processing logic is performed in a device or node within the telephone network and not by the phone or terminal itself. Other less computationally intensive services may be by the consumer's own terminal (phone). Additionally, some terminals are "smarter" than others in that they possess greater processing ability and can, therefore, perform certain services themselves as opposed to relying on the network. The table below provides a sampling of calling services and the location at which they may be performed, that is whether the service is network or terminal based. The following table is exemplary, not exhaustive.

TABLE 1

| CALLING SERVICE | LOCATION WHERE PERFORMED |
|---|---|
| CALL FORWARDING NO RESPONSE | NETWORK BASED |
| CALLING NUMBER DELIVERY/BLOCKING | NETWORK BASED |
| CLOSED USER GROUP | NETWORK BASED |
| LOCAL NUMBER PORTABILITY | NETWORK BASED |
| CONNECTED NUMBER DELIVERY/BLOCKING | NETWORK BASED |
| EMERGENCY CALL | NETWORK BASED |
| MALICIOUS CALL TRACE | NETWORK BASED |
| CALL MONITORING | NETWORK BASED |
| RELEASE LINE TRUNK | NETWORK BASED OR TERMINAL BASED |
| ACCOUNT CODE | NETWORK BASED OR TERMINAL BASED |
| EXTENSION SERVICES | NETWORK BASED OR TERMINAL BASED |
| MULTIPARTY | NETWORK BASED OR TERMINAL BASED |
| CALLING NAME DELIVERY | NETWORK BASED OR TERMINAL BASED |
| 800 QUERY | NETWORK BASED OR TERMINAL BASED |
| IN SERVICE SWITCHING AND RESOURCE FUNCTIONS | NETWORK BASED OR TERMINAL BASED |
| HOLD AND RETRIEVE | TERMINAL BASED |
| CALL SCREENING | TERMINAL BASED |
| CALL TRANSFER | TERMINAL BASED |
| CALL FORWARDING | TERMINAL BASED |
| CALL WAITING | TERMINAL BASED |
| CALL RETURN | TERMINAL BASED |
| SPEED DIALING | TERMINAL BASED |
| REPEAT DIALING | TERMINAL BASED |

New IP telephony networks define interfaces between a terminal (or client) and a network which necessitate a computationally powerful terminal. The terminal must be capable of managing its call state, providing supplementary services, and managing bearer connections, etc. All of these responsibilities require computational processing capacity (hardware) and software logic. Large numbers of terminals will likely be installed into a network which is expensive in terms of hardware. It is possible to create less computationally intense, less expensive terminals. However, the responsibilities of these scaled back terminals still must be supported. The present invention provides for the delegation of certain terminal responsibilities to a server residing on a network. Thus, use can be made of less expensive, less computationally intensive terminals in an IP telephony network.

The present invention is to be distinguished from IP PBX systems and "black box" devices which allow analog phones to be connected to digital PBX systems. The key difference between a terminal proxy as disclosed by the present invention and an IP PBX controller is that the terminal proxy is not a network call processing engine, rather it is a remote implementation of local call processing. The terminal proxy makes a terminal look like a terminal of another type from the perspective of the IP PBX controller or the central office. The key differentiation with respect to the black boxes which permit analog phones to be connected to digital PBXs is that the black box processes the media and is physically between the PBX and the phone. The terminal proxy, in contrast, is a signaling translator which is not physically between the two machines, only logically so.

SUMMARY OF THE INVENTION

The present invention applies traditional telephony architecture and design to an IP telephony network. To date, thin client (simple terminal) solutions have not been proposed for IP telephony, except in such a way as would eliminate service capabilities or bundle them in a network server such as, for instance, an IP PBX controller.

A terminal according to the present invention is designed to identify its supporting server upon initialization. Henceforth, the terminal provides each user input stimulus to that server (or its backup) and responds to stimulus from the server via a network interface to an IP network using, for instance, the NORTEL proprietary universal stimulus IP protocol (hereinafter "UNISTIM IP"). The server is then responsible for managing the state machine of the client, providing local or terminal specific supplementary services, and meeting protocol requirements for, inter afia, the network interface, SIP, or H.323.

The present invention thus comprises at least one terminal coupled to an IP network and a terminal proxy coupled to the IP network and communicable with the terminals. The terminal proxy communicates with and manages the call processing logic for terminals which cannot perform such tasks for themselves. The present invention further comprises a network interface situated between the terminals and the IP network interface for ensuring that all call control functional signaling between the IP network and the terminals are in a compatible format. The present invention still further comprises a terminal adapter coupled to the IP network via the network interface and supports terminals that do not communicate in an IP protocol. The terminal adapter receives the call control protocol of the terminal and converts it into an IP protocol usable by the IP network.

DETAILED DESCRIPTION OF THE INVENTION

The present invention provides a logical means for remote implementation of local call processing that supports calling services and manages call state information and bearer connections in an IP telephony environment on behalf of a terminal which cannot provide those services itself. The premise involves the use of a terminal proxy hosting a client call server residing on the IP network and communicable with "dumb" terminals attached to the IP network. Dumb terminals may take the form of CLASS phones, 2500 sets, IP enabled phones without a high level of computational power, or PCs running IP telephony software. If the terminal happens to be a 2500 set or CLASS phone, then it must be connected to a terminal adapter or gateway mechanism in order to present the proper interface to the IP network. In any event, these dumb terminals will rely on the terminal proxy to perform signaling translation for certain call processing functions. As such, the terminal proxy is not physically between a terminal and an IP PBX. Rather it is logically between the two machines. That is, the terminal proxy makes a terminal appear as another terminal from the perspective of an IP PBX controller.

Figure 1:
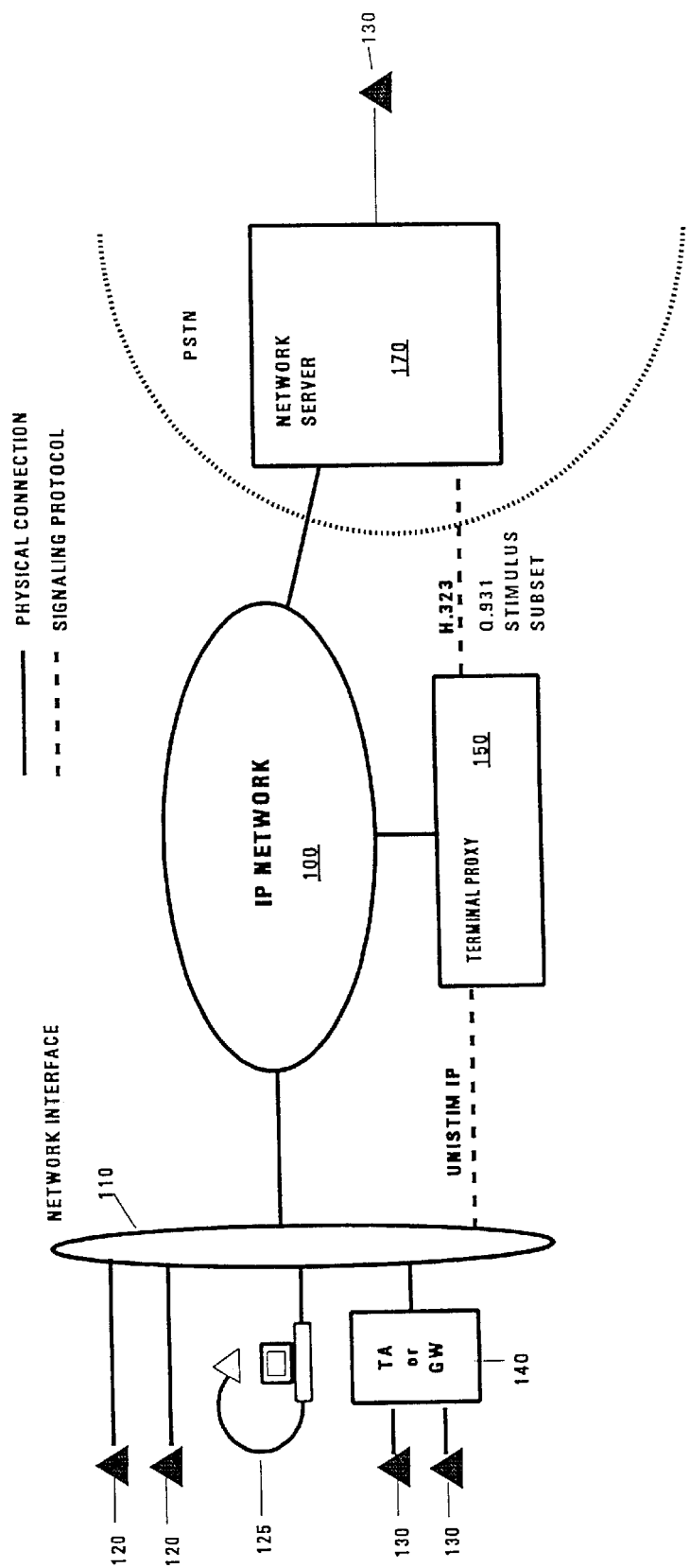
FIG. 1 is a schematic illustrating one possible network architecture for the present invention.

FIG. 1 illustrates an example of a system architecture for use in the present invention. An IP network 100 is connected to a number of terminal devices through a network interface 110. The terminal devices illustrated include IP enabled phones 120, compound terminal(s) 125 comprising more than one physical device such as, for instance, a phone and a computer, and standard 2500 terminals 130. The 2500 terminals 130 are coupled to the network interface 110 via a terminal adapter/gateway 140. IP network 100 is also coupled to a terminal proxy 150. The terminals 120, 125, 130 become logical entities to the remainder of the telephony network via terminal proxy 150.

Additionally, IP network 100 is connected to a network telephony server 170. Terminals 120, 125, 130 communicate with terminal proxy 150 via network interface 110 using a stimulus protocol, most likely UNISTIM IP. UNISTIM IP assumes a call control architecture in which the call control "intelligence" lies outside of the telephone and is thus handled by external call control elements. In the present invention, the call control intelligence is handled either in the terminal itself (rudimentary functions), the terminal proxy 150, or in network server 170 (complex functionality). An implementation of network server 170 may include a gateway and a PSTN central office switch, PBX, H.323 gatekeeper, or SIP proxy.

Terminal proxy 150 and network server 170 communicate over IP network 100 using the H.323 protocol. The primary H.323 telephony network lelements include a gatekeeper, a terminal, and a gateway. A gatekeeper (GK) is the network entity responsible for IP network address resolution and bandwidth allocation. Terminals provide for real-time two-way communication with one another. The gateway (GW) is the network entity that provides an interface to a non-H.323 network such as, for instance, a public switching telephone network (PSTN). These elements when combined form an H.323 Zone. There may be several gateways in an H.323 zone, each of which provide an interface into some non-H.323 network. The terminals and the gateways are the endpoints of the zone and the gatekeeper manages communications between endpoints of the zone.

To support a plain old telephone service (POTS) terminal 130, e.g., a 2500 set, in the H.323 IP network 100, additional network elements are required. POTS phones are connected to IP network 100 via a terminal adapter (TA) 140. Signaling between POTS terminals and the terminal adapter complies with LATA Switching Systems Generic Requirements (LSSGR). Terminal adapter 140 interacts with the terminal proxy (TP) 150 based on a Stimulus Protocol, such as, for instance SGCP. The stimulus protocol is a messaging system that describes POTS terminal operations. Terminal proxy 150 logically supplies the functional intelligence of an H.323 compliant terminal on behalf of terminal adapter 140 and its supported terminals 130.

The terminal proxy 150 is a software entity that provides the intelligence and processing for calling services, including basic call processing, on behalf of less capable terminals such as the IP phones 120 and 2500 sets 130 illustrated in FIG. 1. While the terminal proxy logic could be located on the customer premise, potentially running on the terminal adapter processor, a centralized implementation reduces cost, increases reliability, and facilitates administration. Thus, terminal proxy 150 is a logical remote implementation of local call processing.

One embodiment uses UNISTIM IP as the signaling protocol between terminal adapter 140 and terminal proxy 150 while a stimulus subset of the Q.931 protocol is for communication between terminal proxy 150 and network server 170.

Figure 2:
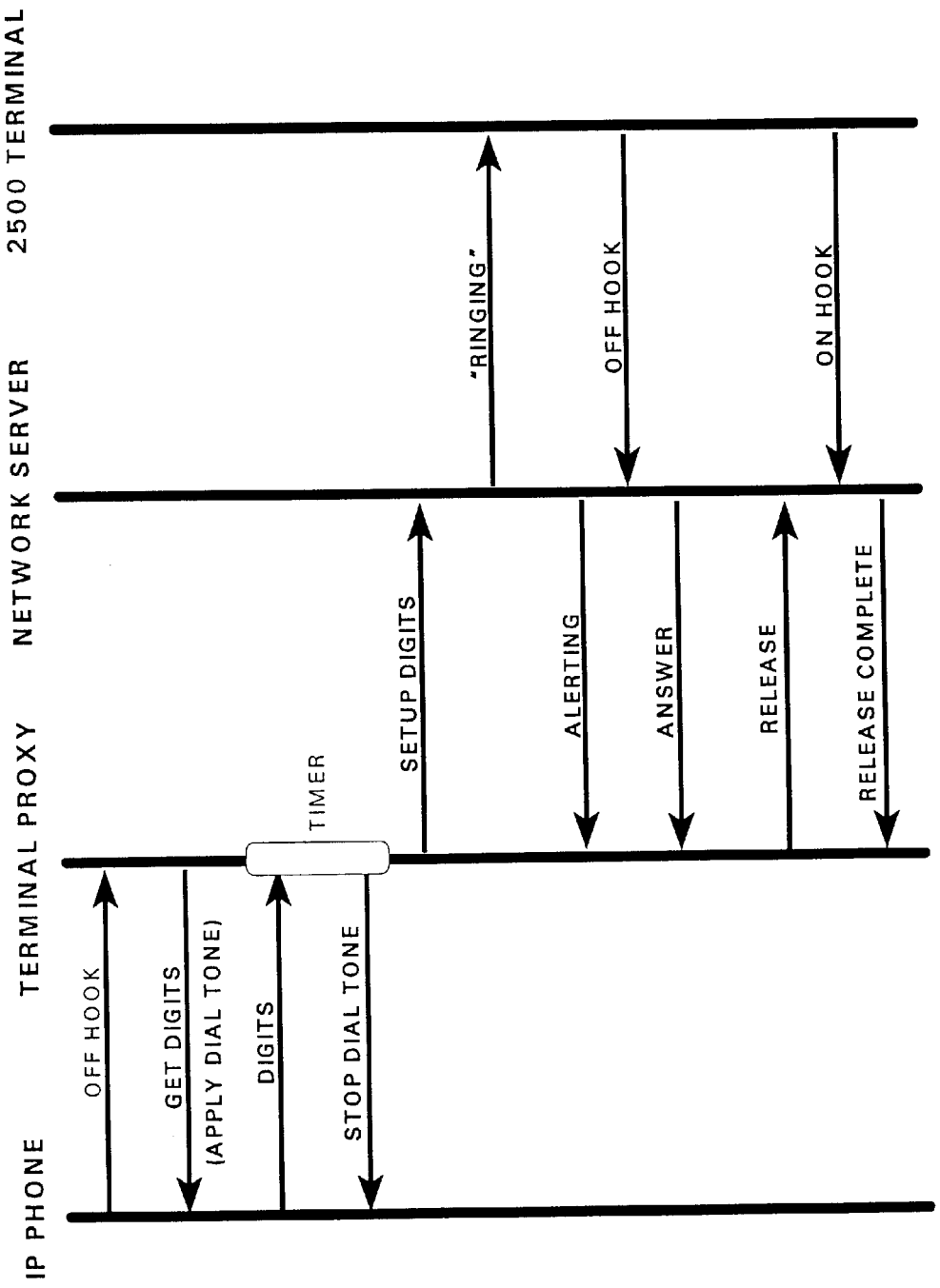
FIG. 2 is a message sequence diagram illustrating the call control processing utilized by the terminal proxy methodology of the present invention.

FIG. 2 illustrates the message sequencing that occurs when an IP phone user initiates a call with a 2500 terminal. An IP Phone subscriber lifts his handset thereby initiating an off hook message which is sent to the terminal proxy. The terminal proxy then sends a return message requesting application of a dial tone and awaits digit entry from the subscriber. The terminal proxy also starts a timer with sufficient time allotted for the subscriber to enter the digits. The subscriber then inputs the digits of the directory number of the terminal that he wishes to call. Upon receipt of the correct number of digits, the terminal proxy sends a message back to the IP phone to stop the dial tone followed by a setup message to the network server serving the IP phone. The setup message informs the network server that a call to the end terminal 2500 set is being made. The network server responds by ringing the desired 2500 Iiterminal while also sending an alerting message back to the terminal proxy. The terminal proxy sends a message requesting a ringback be applied to the IP phone to inform the calling party that the 2500 terminal is ringing. When the called party answers the 2500 terminal, an off hook message is sent to the network server. The network server then forwards an answer message to the terminal proxy. The terminal proxy sends a message request to stop the ringback and open a media channel for cut through audio. The two parties can now engage in a conversation. When the conversation is complete and the IP phone is placed back in its cradle, an on hook message is sent to the terminal proxy signifying the call is over. The terminal proxy responds by sending a release message to the network server. Once the 2500 terminal has "hung up" an on hook message is sent to its network server. The network server responds by sending a release complete message back to the terminal proxy indicating that the calling and called parties have concluded their call and their connection has been terminated. Both terminals are now placed back into a ready state.

The foregoing example illustrates the concept of having the terminal proxy manage the call on behalf of an IP phone. Similar processing would occur had the calling party used a 2500 terminal, or the like, connected to a terminal adapter. In such a case, the terminal adapter is required to interpret the 2500 terminal's POTS operations.

Call state information, bearer connections, and calling services are handled in the terminal proxy residing on the IP network rather than at the terminal (IP phone). To implement such a system it is necessary for the terminal to identify its supporting server within the IP network upon initialization. This is achieved utilizing standard operations that are well known in the art such as, for instance, DHCP or direct keying into the terminal.

It is to be understood that each of the method or process steps illustrated herein are readily implementable by those of ordinary skill in the art as a computer program product having a medium with a computer program embodied thereon. The computer program product is capable of being loaded and executed on the appropriate computer processing device(s) in order to carry out the method or process steps described. In addition, appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

It is to be further understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A client proxy signaling system for an IP telephony network comprising:
   at least one terminal coupled to an IP network; and
   a terminal proxy coupled to said IP network communicable with said at least one terminal for providing logical call processing signaling on behalf of said at least one terminal,
   wherein said terminal proxy communicates with and manages the call processing logic for said at least one terminal with respect to the remainder of a telephony network.

2. The system of claim 1 further comprising a terminal adapter coupled to said IP network and said terminal proxy and supporting at least one terminal that does not communicate in an IP protocol, said terminal adapter for receiving the call control protocol of the at least one terminal and converting same into an IP protocol usable by the IP network.

3. The system of claim 2 wherein said IP protocol between the terminal adapter and the terminal proxy is the simple gateway control protocol (SGCP).

4. The system of claim 2 wherein said IP protocol between the terminal proxy and a network server is the H.323 protocol.

5. The system of claim 4 wherein the network server is a PSTN central office switch.

6. The system of claim 4 wherein the network server is a PBX.

7. The system of claim 4 wherein the network server is an H.323 gatekeeper.

8. The system of claim 4 wherein the network server is a SIP proxy.

9. The system of claim 2 wherein said IP protocol between the terminal proxy and a network server is a subset of the Q.931 stimulus protocol.

10. The system of claim 9 wherein the network server is a PSTN central office switch.

11. The system of claim 9 wherein the network server is a PBX.

12. The system of claim 9 wherein the network server is an H.323 gatekeeper.

13. The system of claim 9 wherein the network server is a SIP proxy.

14. A method of providing client proxy signaling in an IP telephony network for a terminal that cannot perform such signaling itself, said method comprising the steps of:

(a) identifying a terminal proxy on an IP network upon initialization of the terminal; and (b) exchanging call processing messages between the terminal and the terminal proxy such that the terminal proxy manages the call processing logic for the terminal on behalf of the terminal with respect to the remainder of a telephony network.

15. A client proxy signaling system for an IP telephony network comprising:

means for identifying a terminal proxy on an IP network upon initialization of a terminal; and means for exchanging call processing messages between the terminal and the terminal proxy such that the terminal proxy manages the call processing logic for the terminal on behalf of the terminal with respect to the remainder of a telephony network.

16. A client proxy signaling computer program product for an IP telephony network having a medium with a computer program embodied thereon comprising:

computer program code for identifying a terminal proxy on an IP network upon initialization of a terminal; and computer program code for exchanging call processing messages between the terminal and the terminal proxy such that the terminal proxy manages the call processing logic for the terminal on behalf of the terminal with respect to the remainder of a telephony network.

* * * * *